(12) United States Patent
Mukai

(10) Patent No.: US 10,900,809 B2
(45) Date of Patent: Jan. 26, 2021

(54) MAGNETIC SENSOR HAVING SENSOR GEAR, ELECTRIC MOTOR HAVING THE MAGNETIC SENSOR, AND METHOD OF MANUFACTURING MACHINE HAVING THE MAGNETIC SENSOR

(71) Applicant: FANUC CORPORATION, Yamanashi (JP)

(72) Inventor: Yasuhito Mukai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/111,509

(22) Filed: Aug. 24, 2018

(65) Prior Publication Data
US 2019/0063952 A1 Feb. 28, 2019

(30) Foreign Application Priority Data
Aug. 30, 2017 (JP) .................. 2017-165824

(51) Int. Cl.
*G01D 5/14* (2006.01)
*G01B 7/30* (2006.01)
(Continued)

(52) U.S. Cl.
CPC .............. *G01D 5/145* (2013.01); *G01B 7/30* (2013.01); *G01D 5/16* (2013.01); *G01D 5/24442* (2013.01);
(Continued)

(58) Field of Classification Search
CPC ............ G01D 5/14; G01D 5/142; G01D 5/16; G01D 5/145; G01D 5/24442; G01D 5/147;
(Continued)

(56) References Cited

U.S. PATENT DOCUMENTS 3,621,727 A * 11/1971 Cicognani .............. B29D 29/08
474/205
4,835,505 A * 5/1989 Hattori ..................... G01P 1/00
335/284

(Continued)

FOREIGN PATENT DOCUMENTS

JP      S59068270 U    5/1984
JP      60194312 A    10/1985
(Continued)

*Primary Examiner* — David M Schindler
(74) *Attorney, Agent, or Firm* — RatnerPrestia

(57) ABSTRACT

A high-precision magnetic sensor, an electric motor having the magnetic sensor, and a method of manufacturing a machine having the magnetic sensor. A gap adjusting member is attached to a radially outer portion of teeth of a sensor gear. In a manufacturing process of a machine having the magnetic sensor, the gap adjusting member is positioned between a detecting part and the tooth of the sensor gear, and a state in which the gap adjusting member contacts both the detecting part and the tooth can be easily realized due to magnetic force applied between the sensor gear and the detecting part. Therefore, a desired gap corresponding to the thickness of the gap adjusting member can be easily obtained, without carrying out the burdensome and skillful operation for adjusting the gap as in the prior art.

1 Claim, 3 Drawing Sheets

(51) Int. Cl.
  *H02K 11/215* (2016.01)
  *H02K 11/21* (2016.01)
  *G01D 5/244* (2006.01)
  *G01D 5/16* (2006.01)
  *G01P 3/487* (2006.01)
  *H02K 7/116* (2006.01)

(52) U.S. Cl.
  CPC ........... *H02K 11/21* (2016.01); *H02K 11/215* (2016.01); *H02K 7/116* (2013.01)

(58) Field of Classification Search
  CPC ..... G01D 11/245; G01P 3/487; H02K 11/215; H02K 11/21; G01B 7/14; G01B 7/30; Y10T 29/49002; Y10T 29/49004; Y10T 29/49012; Y10T 29/4902; Y10T 29/49082
  See application file for complete search history.

(56) References Cited

U.S. PATENT DOCUMENTS

| | | | |
|---|---|---|---|
| 5,663,644 A | 9/1997 | Shimamura et al. | |
| 8,854,035 B2 * | 10/2014 | Akahane | G01D 5/145 29/428 |
| 9,200,529 B2 | 12/2015 | Buchal et al. | |
| 2011/0254542 A1 * | 10/2011 | Meyer | F16C 3/02 324/207.25 |
| 2013/0141087 A1 * | 6/2013 | Odaka | G01D 5/24442 324/207.25 |
| 2016/0181888 A1 * | 6/2016 | Kodani | G02B 26/121 310/68 B |

FOREIGN PATENT DOCUMENTS

| | | |
|---|---|---|
| JP | 01299414 A | 12/1989 |
| JP | 04279816 A | 10/1992 |
| JP | H04124414 U | 11/1992 |
| JP | 2000304838 A | 11/2000 |
| JP | 2001066151 A | 3/2001 |
| JP | 2001317966 A | 11/2001 |
| JP | 2005017162 A | 1/2005 |
| JP | 2005249803 A | 9/2005 |
| JP | 2008-216044 A1 | 9/2008 |
| JP | 2008249343 A | 10/2008 |
| JP | 2012-108063 A | 6/2012 |
| JP | 2013534989 A | 9/2013 |
| JP | 2017-026383 A | 2/2017 |
| WO | 9606329 A1 | 2/1996 |

* cited by examiner

MAGNETIC SENSOR HAVING SENSOR GEAR, ELECTRIC MOTOR HAVING THE MAGNETIC SENSOR, AND METHOD OF MANUFACTURING MACHINE HAVING THE MAGNETIC SENSOR

CROSS-REFERENCE TO RELATED APPLICATION

This application is a new U.S. Patent Application that claims benefit of Japanese Patent Application No. 2017-165824, filed Aug. 30, 2017, the disclosure of this application is being incorporated herein by reference in its entirety for all purposes.

BACKGROUND OF THE INVENTION

1. Field of the Invention

The present invention relates to a magnetic sensor having a sensor gear, an electric motor having the magnetic sensor, and a method of manufacturing a machine having the magnetic sensor.

2. Description of the Related Art

As a means for detecting a rotational velocity or angle of an electric motor used in a machine tool or an industrial robot, a magnetic sensor having a sensor gear attached to a rotor of the motor may be used (e.g., refer to JP 2017-026383 A).

Further, it is well-known to arrange a means adjusting a distance between a detected body (or a rotating body) and a detecting part (or an element), in order to improve an accuracy of the sensor (e.g., refer to JP 2008-216044 A and JP 2012-108063 A).

In the magnetic sensor, it is required that the distance (or the gap) between the sensor gear and the detecting part configured to detect the rotational velocity (or angular position) of the sensor gear be adjusted to or maintain at a desirable value. However, the adjustment of the gap requires a lot of experience and skill, and thus it is desired that the gap can be easily adjusted by using a simple structure.

SUMMARY OF THE INVENTION

One aspect of the present disclosure provides a magnetic sensor, comprising: a sensor gear configured to be attached to a rotating body; a detecting part positioned opposed to an outer circumference part of the sensor gear and separated from the outer circumference part by a predetermined gap, the detecting part being configured to magnetically detect a plurality of teeth formed on the outer circumference part at predetermined intervals, and output a signal representing as to whether the tooth exists or not at a predetermined position; a holding member configured to hold the detecting part; an attachment table to which the holding member is attached; a fixing member configured to fix the holding member to the attachment table; and a gap adjusting member positioned between the tooth of the sensor gear and the detecting part, the gap adjusting member being configured to adjust the gap between the tooth and the detecting part by contacting both the tooth and the detecting part.

Another aspect of the present disclosure provides an electric motor, comprising: a rotating body; a sensor gear configured to be attached to the rotating body; a detecting part positioned opposed to an outer circumference part of the sensor gear and separated from the outer circumference part by a predetermined gap, the detecting part being configured to magnetically detect a plurality of teeth formed on the outer circumference part at predetermined intervals, and output a signal representing as to whether the tooth exists or not at a predetermined position; a holding member configured to hold the detecting part; an attachment table to which the holding member is attached; a fixing member configured to fix the holding member to the attachment table; and a gap adjusting member positioned between the tooth of the sensor gear and the detecting part, the gap adjusting member being configured to adjust the gap between the tooth and the detecting part by contacting both the tooth and the detecting part.

Still another aspect of the present disclosure provides a method of manufacturing a machine including a rotating body and the magnetic sensor as set forth in claim 1, the method comprising the steps of: attaching the sensor gear to the rotating body; arranging the gap adjusting member between the tooth of the sensor gear and the detecting part; positioning the holding member holding the detecting part at the attachment table; and fixing the holding member to the attachment table by using the fixing member.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
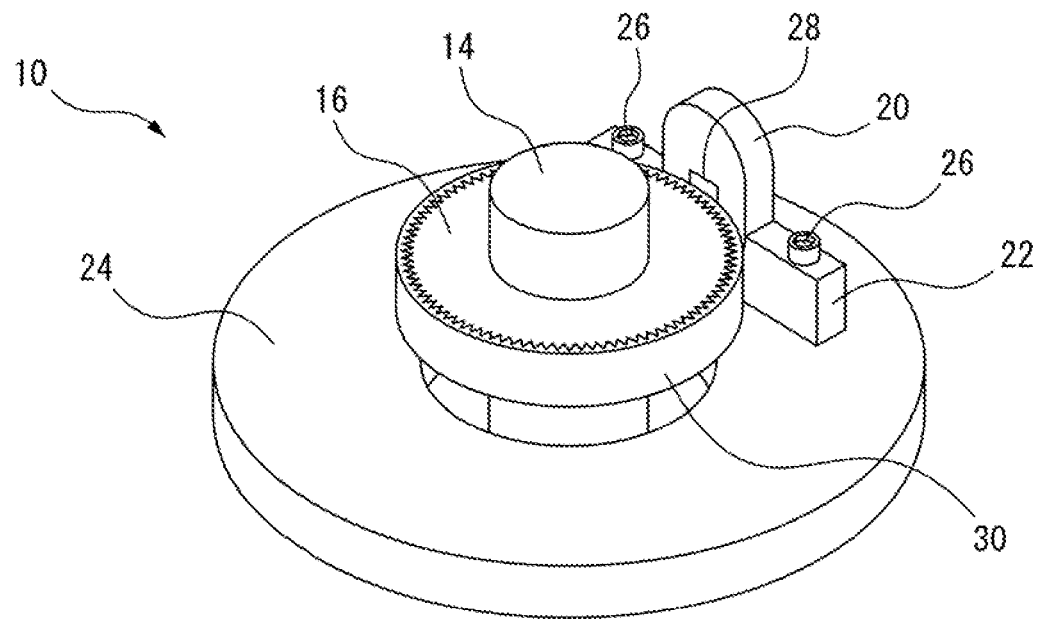
FIG. 1 is a perspective view showing a schematic configuration of a magnetic sensor according to a first embodiment.
Figure 2:
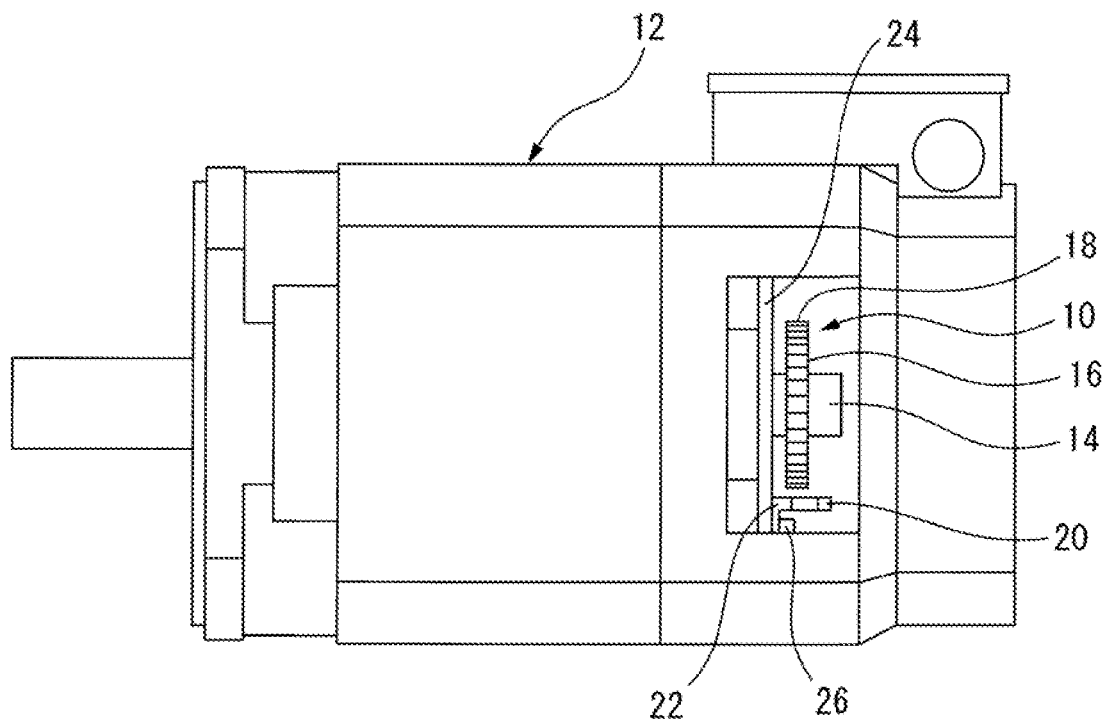
FIG. 2 is an axial cross-sectional view of an electric motor including the magnetic sensor of FIG. 1.

FIG. 1 is a perspective view showing a schematic configuration of a magnetic sensor 10 according to a first embodiment, and FIG. 2 is an axial cross-sectional view of an electric motor 12 incorporating magnetic sensor 10 therein. In the drawings, different scales may be used for the clarity. Magnetic sensor 10 has a sensor gear 16 attached to a rotor (rotating body) 14 configured to be rotated relative to a stator of electric motor 12 such as a servomotor; a plurality of teeth 18 formed on an outer circumference part of sensor gear 16 at predetermined intervals; a detecting part 20 configured to detect existence of tooth 18 at a predetermined position (e.g., a position opposed to detecting part 20) as a signal; a holding member 22 configured to hold detecting part 20; an attachment table 24 to which holding member 22 is attached; a fixing member 26, such as a screw, configured to fix holding member 22 to attachment table 24. When holding member 22 is attached to attachment table 24, detecting part 20 on holding member 22 is positioned opposed to the outer circumference part of sensor gear 16 having teeth 18 formed thereon.

Detecting part 20 has a hall element 28, an output voltage of which varies depending on a change in magnetic field. Since sensor gear 16 is constituted from a magnetic material, the magnetic field with respect to hall element 28 is varied depending on as to whether or not tooth 18 of sensor gear 16 exists at a position opposed to or facing hall element 28. Therefore, when one of teeth 18 of sensor gear 16 is positioned opposed to hall element 28 of detecting part 20, hall element 28 outputs a detecting signal, concretely, a pulse signal representing that tooth 18 exists at the predetermined position.

Due to the rotation of sensor gear 16, teeth 18 of sensor gear 16 are moved so as to cut across in front of detecting part 20 in the circumference direction thereof, and thus the detecting signal from detecting part 20 is periodically output. By virtue of this, magnetic sensor 10 can detect the rotational velocity of rotor 14, based on the frequency of the detecting signal from detecting part 20. In other words, magnetic sensor 10 may be used as an encoder. In addition, a magnetoresistance effect element may be used instead of hall element 28.

In the first embodiment, a gap adjusting member 30 (not shown in FIG. 2) is attached to an outer circumference part of sensor gear 16 (concretely, a radially outer portion of tooth 18). Herein, the term "radial(ly)" or "axial(ly)" relates to rotor 14. Gap adjusting member 30 is manufactured from a material having a hardness lower than either a material (normally, metal) constituting sensor gear 16 or a material (normally, metal) constituting detecting part 20. For example, gap adjusting member 30 may be manufactured by a molding process using a flexible material (e.g., a fiber such as a string, a textile or a non-woven cloth; a paper; or a soft resin) and a mold. Alternatively, gap adjusting member 30 may be adhered to (teeth 18 of) sensor gear 16 by using an adhesive having relatively low adhesive force. Concretely, the adhesive force may be determined so that gap adjusting member 30 does not fall down due to its weight from sensor gear 16.

It is preferable that the thickness (or radial length) of gap adjusting member 30 be equal to a magnitude (e.g., 0.1 mm) of a clearance or gap G (see FIG. 5 as explained below) to be formed between tooth 18 and detecting part 20, in order to achieve an original function of magnetic sensor 10.

Figure 3:
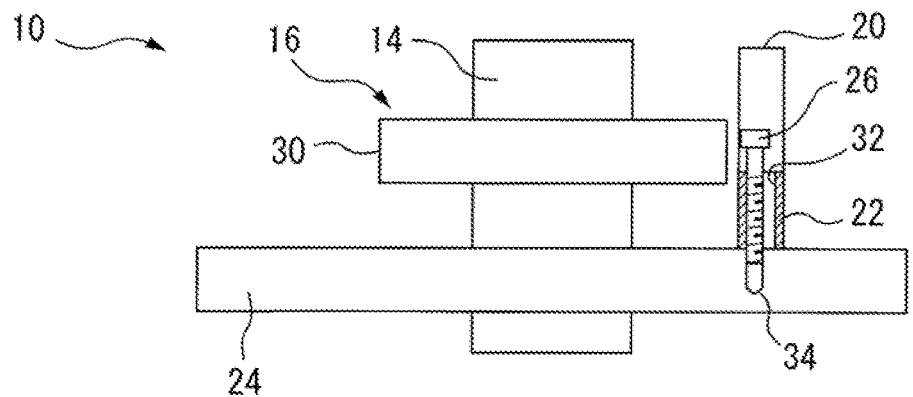
FIG. 3 is a view explaining a state in which a holding member is positioned at an attachment table in the first embodiment.
Figure 4:
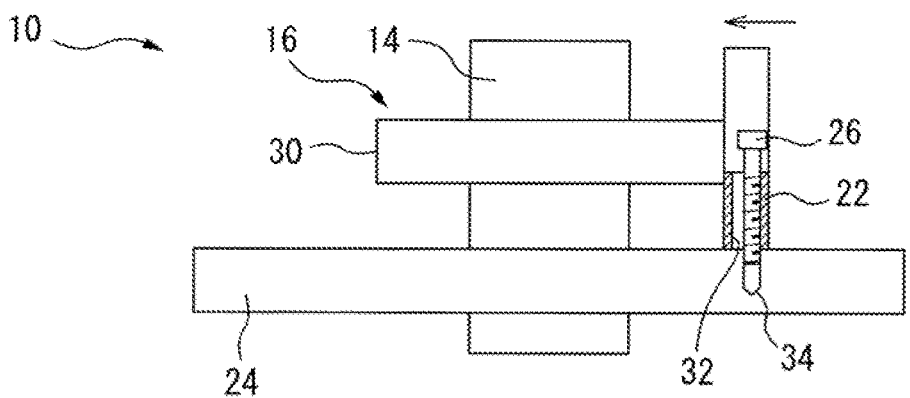
FIG. 4 is a view explaining a state in which the holding member is displaced toward the sensor gear by magnetic force in the first embodiment.
Figure 5:
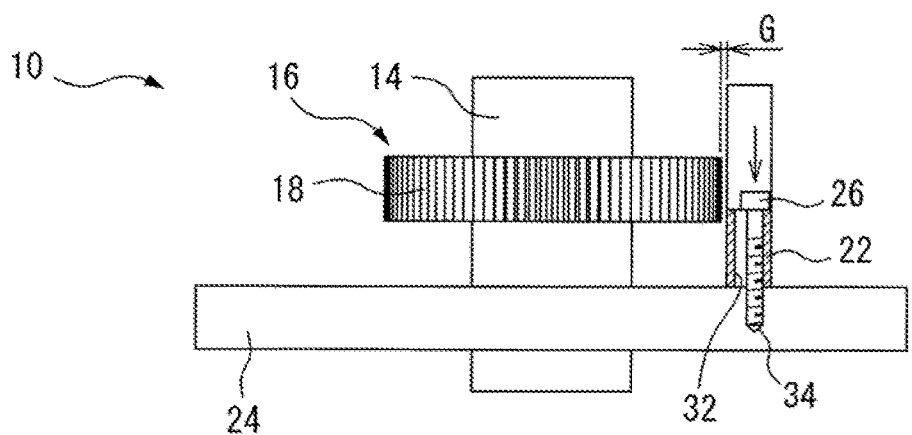
FIG. 5 is a view explaining a state in which the holding member is fixed to the attachment table in the first embodiment.

FIGS. 3 to 5 explain a process for fixing holding member 22 to attachment table 24, i.e., a part of a method for manufacturing (or assembling) a machine such as electric motor 12 having magnetic sensor 10. First, sensor gear 16 having gap adjusting member 30 is attached to a rotating body such as rotor 14 of the machine. Otherwise, gap adjusting member 30 may be attached to sensor gear 16 after sensor gear 16 is attached to the rotating body. Next, as shown in FIG. 3, holding member 22 holding detecting part 20 is positioned at a predetermined place on attachment table 24. Further, screw 26 is inserted into a through hole 32 formed in holding member 22, and then screw 26 is partially threaded into (or temporarily fixed to) a threaded hole 34 formed in attachment table 24.

For the ease of assembly, there is a clearance or allowance between screw 26 and through hold 32. Therefore, in the state of FIG. 3, in which screw 26 is not fully tightened, holding member 22 can be displaced in a direction toward to or away from sensor gear 16 (in the horizontal direction in FIG. 3), within the allowance. In this regard, since the magnetic force is generated between sensor gear 16 and detecting part 20, as a result, as shown in FIG. 4, holding member 22 substantially integral with detecting part 20 is displaced toward to sensor gear 16 (in the left direction in FIG. 4), whereby detecting part 20 comes into contact with gap adjusting member 30.

In other words, in the state of FIG. 4, holding member 22 is positioned while (tooth 18 of) sensor gear 16 and detecting part 20 are separated from each other by distance G which corresponds to the thickness of gap adjusting member 30. Therefore, from the state of FIG. 4, by fastening screw 26 into threaded hole 34, holding member 22 can be stiffly fixed to attachment table 24 while desired gap G is formed between detecting part 20 and tooth 18, as shown in FIG. 5. For the clarity, gap adjusting member 30 is not shown in FIG. 5.

In the conventional magnetic sensor, in order to adjust the gap between the tooth of the sensor gear and the detecting part, after the holding member is attached to the attachment table, an operator knocks the holding member with a hammer, etc., while monitoring a waveform output from the detecting part (the hall element) during the rotor is actually rotated. On the other hand, in the first embodiment, in the assembling (manufacturing) process of magnetic sensor 10, gap adjusting member 30 is positioned between detecting part 20 and tooth 18 of sensor gear 16, and a state in which gap adjusting member 30 contacts both detecting part 20 and tooth 18 can be easily realized due to the magnetic force applied between sensor gear 16 and detecting part 20. Therefore, in the first embodiment, the desired gap corresponding to the thickness of gap adjusting member 30 can be easily obtained, without carrying out the burdensome and skillful operation for adjusting the gap as in the prior art.

The series of operations as shown in FIGS. 3 to 5 can be automated. Concretely, an industrial machine such as a robot (not shown) may be used, and the machine may be configured to grip holding member 22, locate it at a predetermined position on attachment table 24, and fix holding member 22 to attachment table 24 by using screw 26. During the operations, before screw 26 is fully tightened, holding member 22 is automatically displaced toward sensor gear 16 due to the magnetic force, and then gap G corresponding to the thickness of gap adjusting member 30 is automatically formed between tooth 18 of sensor gear 16 and detecting part 20. Therefore, merely by performing the simple operation (e.g., locating holding member 22 and tightening screw 26) by using the automated machine having the robot, etc., a high-precision magnetic sensor having desired gap G can be obtained.

In the example of FIG. 1, gap adjusting member 30 is attached to the whole circumference of sensor gear 16 (so as to cover all of teeth 18). However, gap adjusting member 30 may be attached to sensor gear 16 so as to cover a part of teeth 18. In this case, it is required that holding member 22 is fixed to attachment table 24 while sensor gear 16 is positioned at an angular position where gap adjusting member 30 is positioned between tooth 18 and detecting part 20.

Figure 6:
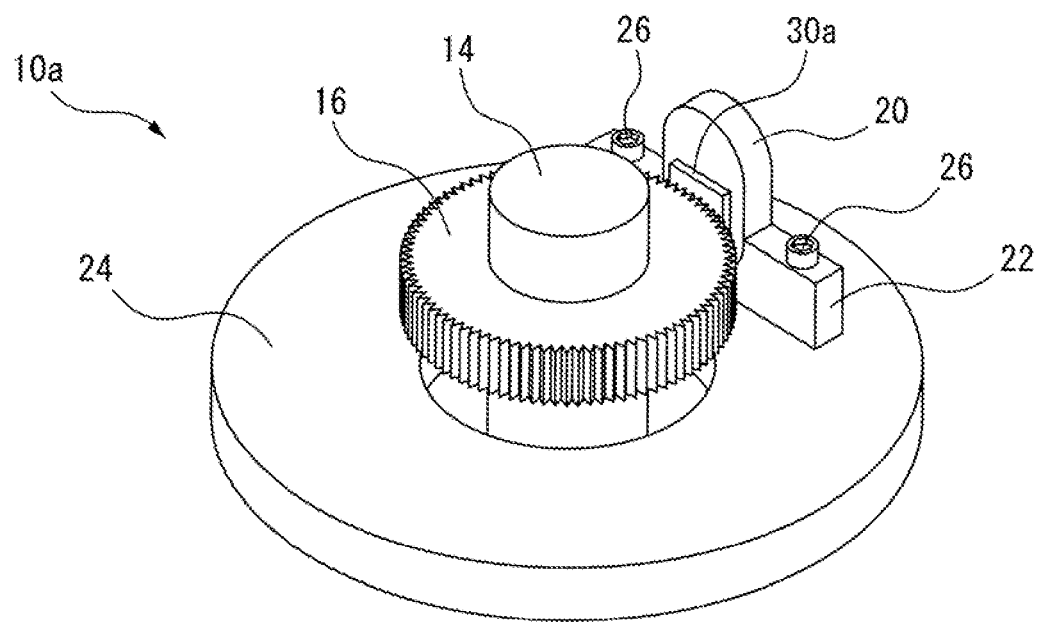
FIG. 6 is a perspective view showing a schematic configuration of a magnetic sensor according to a second embodiment.
Figure 7:
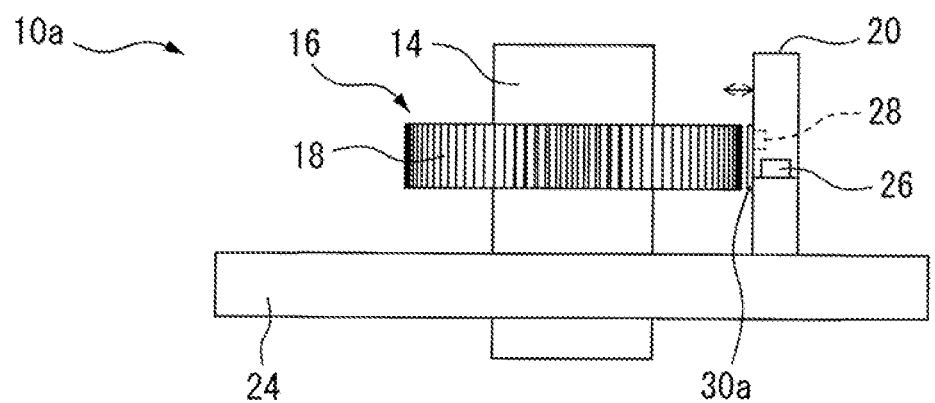
FIG. 7 is a view explaining a state in which a holding member is positioned at an attachment table in the second embodiment.

FIG. 6 is a perspective view showing a schematic configuration of a magnetic sensor 10a according to a second embodiment, and FIG. 7 is a view showing a state in which holding member 22 is positioned at attachment table 24, similarly to FIG. 3. In the second embodiment, only the position and shape of a gap adjusting member 30a may be different from the first embodiment, and hereinafter, only the configuration regarding gap adjusting member 30a will be explained. Further, the same reference numerals are added to the components corresponding to the components of the first embodiment (FIG. 1), and detailed explanations thereof will be omitted.

Unlike the first embodiment, gap adjusting member 30a is not attached to (tooth 18 of) sensor gear 16, instead, is attached to detecting part 20 opposed to sensor gear 16. Concretely, gap adjusting member 30a, having a sheet shape and made from the material the same as gap adjusting member 30 of the first embodiment, is attached by adhesives, etc., to a portion of detecting part 20 opposed to tooth 18. Similarly to the first embodiment, it is preferable that the thickness of gap adjusting member 30a be equal to gap G to be formed between tooth 18 and detecting part 20. By virtue of this, by carrying out the process explained with reference to FIGS. 3 to 5, the desired magnitude of gap is eventually formed between tooth 18 and detecting part 20, similarly to the first embodiment.

After magnetic sensor 10 or 10a is assembled (or manufactured), gap adjusting member 30 or 30a may no longer be necessary. Therefore, it is preferable that gap adjusting member 30 or 30a can be removed (or dropped) from between tooth 18 and detecting part 20. For example, in case that gap adjusting member 30 in the first embodiment is manufactured by molding by using a flexible material, when sensor gear 16 is rotated, gap adjusting member 30 having the lower hardness than detecting part 20 can be broken due to frictional resistance between gap adjusting member 30 and detecting part 20, whereby adjusting member 30 can be easily removed or dropped from between tooth 18 and detecting part 20. Such an operation can be automated.

As another example, in case that gap adjusting member 30a in the second embodiment is adhered to detecting part 20 by using an adhesive having relatively low adhesive force (concretely, by which gap adjusting member 30a does not fall down due to its weight from detecting part 20), when sensor gear 16 is rotated, gap adjusting member 30a can also be removed or dropped from between tooth 18 and detecting part 20, due to frictional resistance between gap adjusting member 30a and tooth 18. Such an operation can also be automated.

At least a portion of gap adjusting member 30 may be remained to be adhered to sensor gear 16, as long as the gap adjusting member does not contact detecting part 20 during the normal rotation of sensor gear 16 (i.e., during the measurement operation by the magnetic sensor). Similarly, at least a portion of gap adjusting member 30a may be remained to be adhered to detecting part 20, as long as the gap adjusting member does not contact sensor gear 16 (or tooth 18) during the normal rotation of sensor gear 16. In these cases, the gap adjusting member should be manufactured from a non-magnetic material, in order to prevent the measurement by the magnetic sensor from being adversely affected.

According to the present disclosure, the desired magnitude of gap can be automatically formed between the sensor gear and the detecting part, and thus the measurement by the magnetic sensor can be carried out with high accuracy, even when the operator does not manually adjust the gap, etc.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A method of manufacturing a machine including a rotating body, a sensor gear configured to be attached to the rotating body, a detecting part positioned opposed to an outer circumference part of the sensor gear and separated from the outer circumference part by a predetermined gap, the detecting part being configured to magnetically detect a plurality of teeth formed on the outer circumference part at predetermined intervals, and output a signal representing as to whether a tooth of the plurality of teeth exists or not at a predetermined position, a holding member configured to hold the detecting part, an attachment table to which the holding member is attached, a fixing member configured to fix the holding member to the attachment table, and a gap adjusting member configured to adjust the gap between the tooth and the detecting part, wherein the gap adjusting member is manufactured from a non-magnetic material, and is adhered to the tooth or the detecting part, and wherein the gap adjusting member is configured to be removed with a rotation of the sensor gear, the method comprising the steps of:

attaching the sensor gear to the rotating body;
arranging the gap adjusting member between the tooth of the sensor gear and the detecting part;
positioning the holding member holding the detecting part at the attachment table;
fixing the holding member to the attachment table by using the fixing member;
adhering the gap adjusting member to the tooth or the detecting part by an adhesive having an adhesive force, the adhesive force being such that the gap adjusting member does not fall down due to its weight from the tooth or the detecting part,
wherein the arranging includes sandwiching the gap adjusting member between the tooth and the detecting part during a gap adjustment procedure, so that the gap adjusting member adjusts the gap by contacting both the tooth and the detecting part; and
removing the gap adjusting member from between the tooth and the detecting part due to the rotation of the sensor gear after the gap adjustment procedure, so that the predetermined gap between the tooth and the detecting part is exposed.

* * * * *